United States Patent
Bansal et al.

(10) Patent No.: US 11,131,776 B2
(45) Date of Patent: Sep. 28, 2021

(54) METHOD AND APPARATUS FOR KALMAN FILTER PARAMETER SELECTION USING MAP DATA

(71) Applicant: GM GLOBAL TECHNOLOGY OPERATIONS LLC, Detroit, MI (US)

(72) Inventors: Jayant Bansal, Richmond Hill (CA); Rakesh Kumar, Markham (CA)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 154 days.

(21) Appl. No.: 16/543,709

(22) Filed: Aug. 19, 2019

(65) Prior Publication Data

US 2021/0055426 A1   Feb. 25, 2021

(51) Int. Cl.
*G01S 19/39* (2010.01)
*G05D 1/02* (2020.01)

(52) U.S. Cl.
CPC .......... *G01S 19/393* (2019.08); *G05D 1/0231* (2013.01); *G05D 1/0278* (2013.01); *G05D 2201/0213* (2013.01)

(58) Field of Classification Search
CPC ......... G01S 19/39; G01S 19/393; G05D 1/02; G05D 1/0278; G05D 1/0231; G05D 1/2201; G05D 1/0213
See application file for complete search history.

(56) References Cited

U.S. PATENT DOCUMENTS

| | | | |
|---|---|---|---|
| 2007/0150198 A1* | 6/2007 | MacDonald | G01S 3/7868 702/2 |
| 2007/0154068 A1* | 7/2007 | Stein | G01S 17/93 382/106 |
| 2015/0142311 A1* | 5/2015 | Sun | G01S 19/49 701/472 |
| 2016/0258764 A1* | 9/2016 | Phuyal | G01C 21/26 |
| 2017/0078575 A1* | 3/2017 | Ryu | G06T 5/003 |
| 2018/0188032 A1* | 7/2018 | Ramanandan | G01S 19/53 |
| 2018/0239027 A1* | 8/2018 | Lu | H04W 4/02 |
| 2020/0183387 A1* | 6/2020 | Heit | G06K 9/00791 |

* cited by examiner

Primary Examiner — Tan Q Nguyen
(74) Attorney, Agent, or Firm — Lorenz & Kopf LLP

(57) ABSTRACT

The present application relates to a method and apparatus including a sensor to detect a current location, a memory for storing a first set of Kalman filter parameters associated with a first environmental condition and a second set of Kalman filter parameters associated with a second environmental condition, a processor for performing an assisted driving algorithm according to the first set of Kalman filter parameters, for receiving the current location, for determining a second set of Kalman filter parameters in response to the current location, for performing the assisted driving algorithm according to the second set of Kalman filter parameters, and for generating a control signal in response to the assisted driving algorithm according to the second set of Kalman filter parameters, and a vehicle controller operative to control a vehicle in response to the control signal.

17 Claims, 5 Drawing Sheets

METHOD AND APPARATUS FOR KALMAN FILTER PARAMETER SELECTION USING MAP DATA

BACKGROUND

The present disclosure relates generally to programming motor vehicle control systems. More specifically, aspects of this disclosure relate to systems, methods and devices for providing a Kalman filter for use with an advanced driving assist system (ADAS) in response to environmental characteristics for use by a vehicle control system.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various ADAS, such as cruise control, adaptive cruise control, and parking assistance systems correspond to lower automation levels, while true "driverless" vehicles correspond to higher automation levels.

Adaptive cruise control systems have been developed where not only does the system maintain the set speed, but also will automatically slow the vehicle down in the event that a slower moving preceding vehicle is detected using various sensors, such as global positioning systems, radar, lidar and cameras. Further, some vehicle systems attempt to maintain the vehicle near the center of a lane on the road. When using the various sensors, noise and uncertainty are introduced into the system which results in some unreliability of each measurement. To compensate for this unreliability, Kalman filters are used to predict a value for a sensor or system which is then compared against an actual sensor measurement in order to reduce the measurement uncertainty. However, due to nature of stochastic involved the Kalman filter tuned for one environment does not work well for a different environment. In order to compensate for these environmental differences, parameters for a worst-case scenario must be maintained which negatively affects ADAS performance. It would be desirable to improve the Kalman filter performance for various environments in order to provide improved performance in an ADAS equipped motor vehicle.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems.

In accordance with an aspect of the present invention, an apparatus including a sensor operative to detect a current location, a memory for storing a first set of Kalman filter parameters associated with a first environmental condition and a second set of Kalman filter parameters associated with a second environmental condition, a processor for performing an assisted driving algorithm according to the first set of Kalman filter parameters, for receiving the current location, for determining a second set of Kalman filter parameters in response to the current location, for performing the assisted driving algorithm according to the second set of Kalman filter parameters, and for generating a control signal in response to the assisted driving algorithm according to the second set of Kalman filter parameters, and a vehicle controller operative to control a vehicle in response to the control signal.

In accordance with another aspect of the present invention wherein sensor includes a global positioning system.

In accordance with another aspect of the present invention further including a camera for detecting the second environmental condition and wherein the second set of Kalman filter parameters are determined in response to the second environmental condition.

In accordance with another aspect of the present invention wherein the second environmental condition is an obstructed overhead view condition.

In accordance with another aspect of the present invention wherein the vehicle controller is operative to reduce a throttle output in response to the control signal.

In accordance with another aspect of the present invention wherein the current location is a wooded location having overhead tree foliage.

In accordance with another aspect of the present invention wherein the second set of Kalman filter parameters are tuning parameters for processing the current location from the sensor.

In accordance with another aspect of the present invention wherein the Kalman filter is used to improve an accuracy of the detection of the current location.

In accordance with another aspect of the present invention a method comprising controlling a vehicle using a Kalman filter having a first set of parameters, receiving a location from a global positioning system sensor, determining a second set of parameters in response to the location, and controlling the vehicle using the Kalman filter having the second set of parameters in response to the vehicle being in the location.

In accordance with another aspect of the present invention wherein the first set of parameters are a default set of parameters.

In accordance with another aspect of the present invention wherein the location is associated with an obstructed sky condition.

In accordance with another aspect of the present invention wherein the location is a wooded location having overhead tree foliage.

In accordance with another aspect of the present invention wherein the method is performed by an advanced driver-assistance system.

The method of claim 9 wherein the Kalman filter is operative to improve an accuracy of the location from the global positioning system.

In accordance with another aspect of the present invention an apparatus for controlling a vehicle comprising a memory for storing a first set of filter parameters and a second set of filter parameters, a sensor for detecting a first sensed location and a second sensed location, a vehicle controller for controlling the vehicle in response to a control signal, for estimating a first estimated location in response to an inertial measurement unit and for estimating a second estimated location in response to the inertial measurement unit, and a processor for determining a first vehicle location in response to the first sensed location and the first estimated location in response to a Kalman filter using the first set of filter parameters, the processor further operative to receive the second location, for comparing the second location to a map data indicative of an environment associated with the second location and the second set of parameters, for determining a second vehicle location in response to the second sensed location and the second estimated location in response to the Kalman filter using the second set of filter parameters, and for generating the control signal in response to the second vehicle location.

In accordance with another aspect of the present invention further including a camera for generating an image and wherein the processor is further operative to confirm the environment associated with the second location in response to the image.

In accordance with another aspect of the present invention wherein the vehicle controller is operative to perform an assisted driving algorithm.

In accordance with another aspect of the present invention wherein the environment associated with the second location has an obstructed sky view.

In accordance with another aspect of the present invention wherein the environment associated with the second location is a wooded location has a sky view obstructed by tree foliage.

In accordance with another aspect of the present invention wherein the first set of parameters are a default set of parameters.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
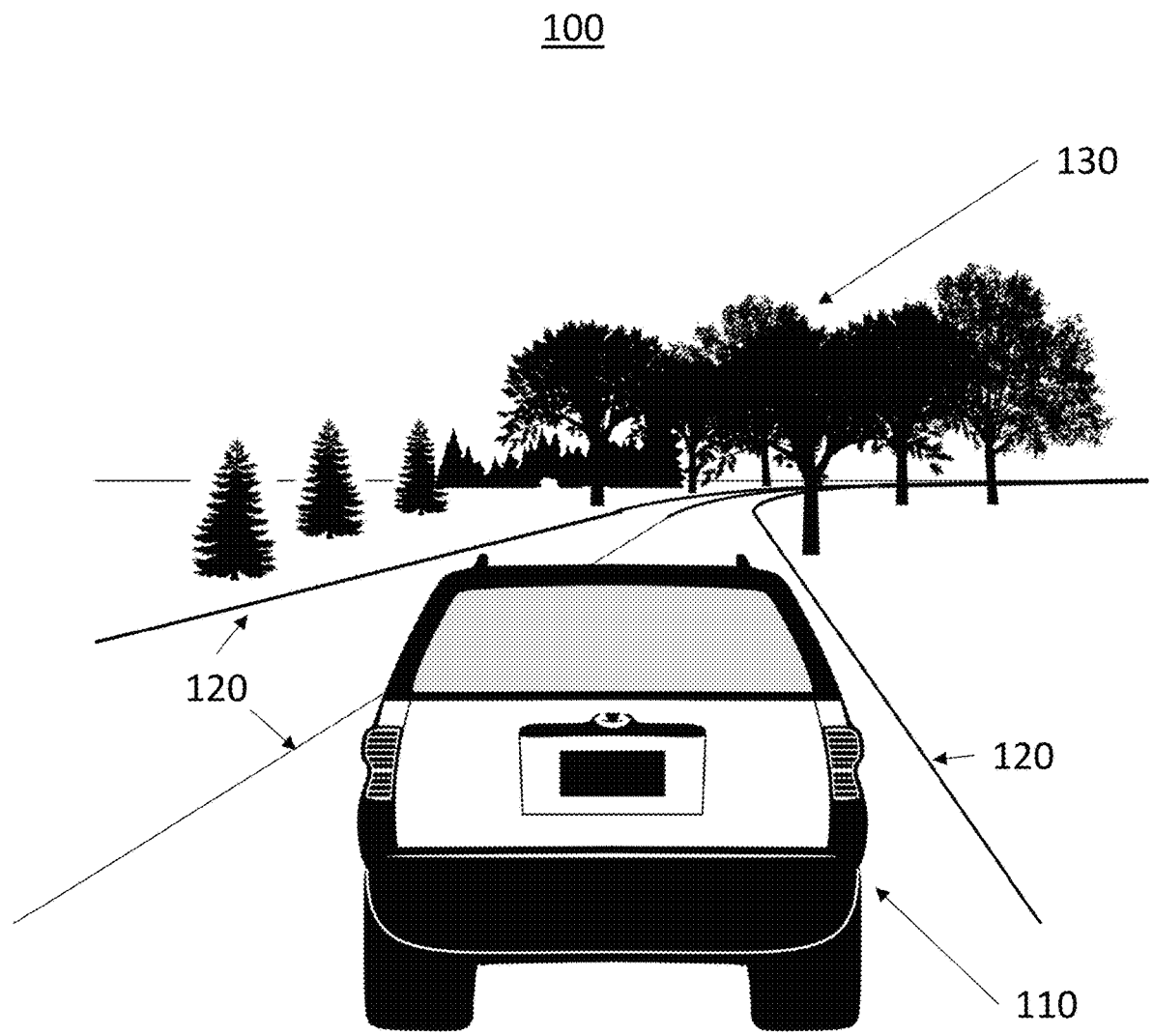
FIG. 1 shows an operating environment for Kalman filter parameter selection using map data for a motor vehicle according to an exemplary embodiment.

FIG. 1 schematically illustrates an operating environment for Kalman filter parameter selection using map data 100 for a motor vehicle 110. In this exemplary embodiment of the present disclosure, the vehicle is traveling along a road lane demarcated by lane markers 120. The road lane depicted is a first road segment having an unobstructed sky view condition approaching a second road segment 130 having a foliage obstructed sky view condition. In this exemplary embodiment, the vehicle 110 is operating in an assisted driving lane centering mode wherein the vehicle control system is operative to use cameras and other sensors to control the vehicle such that the vehicle 110 stays in the center of the driving lane. The exemplary vehicle 110 is equipped with a map database and a global positioning system (GPS) sensor and a low fidelity camera. It would be desirable for the ADAS system to make use of map database in order to adapt different tuning parameter for Kalman filter. Using map data, the road class and environment may be obtained and the Kalman filter can be tuned accordingly.

In this exemplary embodiment, Road Class Information from the stored map data may be used to determine the most effective tuning parameters of the Kalman filter to work seamlessly across different environments with consistency and accuracy. A Kalman filter is based on modelling of stochastic noises which has different characteristics in different environment. Due to these different characteristics, current ADAS implementations may operate poorly in foliage conditions since the Kalman filter is tuned for open sky scenarios. The Kalman filter can be made adaptive using the environment information from map data and the stochastic process can be re-defined based on environment characteristics from map data. The tuning can be done on the fly or can be done offline and stored for various environments. For offline process the Kalman filter tuning parameters can be loaded based on environment information from map data. By doing so the vehicle location can be made accurate seamlessly and consistently across different environments.

In an additional embodiment, Road Class Information may be used to aid in GNSS vertical accuracy. In an typically GNSS location determination all satellite signals are transmitted from above the receiver. While stochastic errors in the horizontal direction are compensated for in the satellite horizontal distribution, there remains poor vertical accuracy due and large bias and error in the vertical direction. In this exemplary embodiment, Road Class Information and map altitude information can be used to generate a virtual satellite from below the GPS receiver thereby improving the vertical dilution of precision (DO)P and 3D accuracy. For example, using the map location and altitude information, a virtual GNSS satellite may be projected below the vehicle receiver. A virtual GNSS signal may be generated in response to the virtual satellite location and used along with the received GNSS signals to more accurately establish the location of the GNSS receiver.

Figure 2:
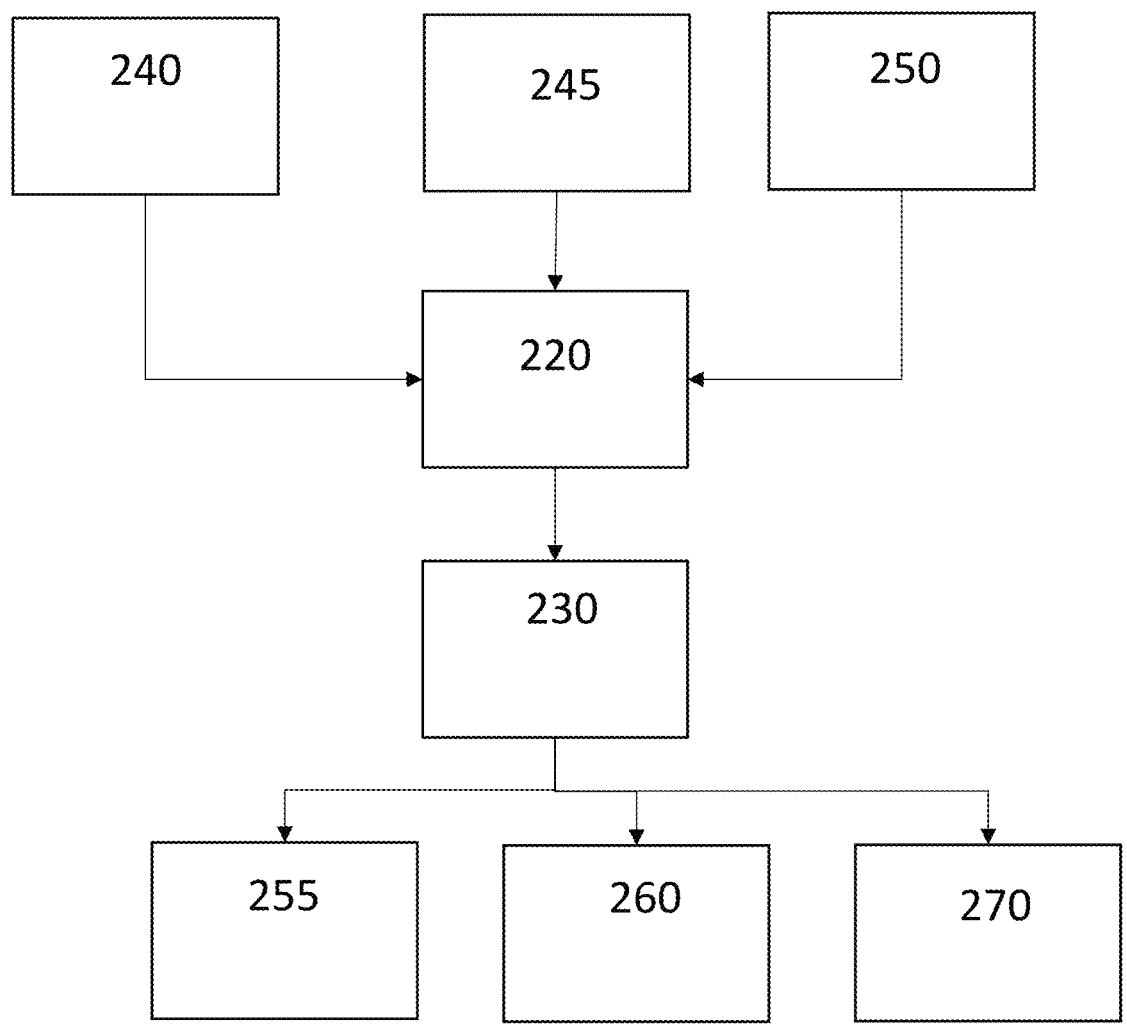
FIG. 2 shows a block diagram illustrating a system for Kalman filter parameter selection using map data for assisted driving according to an exemplary embodiment.

Turning now to FIG. 2, a block diagram illustrating an exemplary implementation of a system for Kalman filter parameter selection using map data 200 is shown. The system 200 includes a processor 220, a camera 240 and a GPS sensor 245. In addition, the processor 220 may receive information such as map data 250 from a memory or the like.

The GPS sensor 245 receives a plurality of time stamped satellite signals including the location data of a transmitting satellite. The GPS then uses this information to determine a precise location of the GPS sensor 245. The processor 220 may be operative to receive the location data from the GPS sensor 245 and/or store this location data to the memory 250. The memory 250 may be operative to store map data for use by the processor 220.

The camera 240 may be a low fidelity camera with a forward field of view (FOV). The camera 240 may be mounted inside the vehicle behind the rear view mirror or may be mounted on the front fascia of the vehicle. The camera may be used to detect or confirm environmental map data, such as tunnels, foliage, overhead obstructions and the like. In an exemplary embodiment, an image captured by the camera 240 may be used by the processor 220 to estimate an operating environment. For example, the processor 220 may perform an image processing function and determine that the vehicle is operating in a location where the sky is obscured by tree foliage in response to the image. The processor 220 may then change the Kalman parameters used in an ADAS algorithm corresponding to the determined operating environment. In another exemplary embodiment, the image captured by the camera 240 may also be used to confirm the environmental conditions indicated by the map data.

The memory 250 may be used to store map data related to roadways, lane data, elevation, environment, etc. The map data may be high definition map data having a centimeter resolution. The high definition map data may include a base map layer, a geometric map layer, a semantic map layer, a map priors level and a real time layer. The high definition map data may be continuously updated through a wireless communications network. In addition, data collected by the vehicle sensors may be transmitted via the wireless network for computational purposes, with the results received via the wireless network and used to augment the high definition map data.

The processor 220 is operative to engage and control the ADAS in response to an initiation of the ADAS algorithm, such as adaptive cruise control. In an ADAS operation, the processor 220 may be operative to generate a desired path in response to a user input or the like wherein the desired path may include lane centering, curve following, lane changes, etc. This desired path information may be determined in response to the vehicle speed, the yaw angle and the lateral position of the vehicle within the lane. Once the desired path is determined, a control signal is generated by the processor 220 indicative of the desired path and is coupled to the vehicle controller 230. The vehicle controller 230 is operative to receive the control signal and to generate an individual steering control signal to couple to the steering controller 270, a braking control signal to couple to the brake controller 260 and a throttle control signal to couple to the throttle controller 255 in order to execute the desired path.

According to an exemplary embodiment, the processor 220 is operative perform the ADAS algorithm in response to an initiation of the ADAS function by the vehicle control system or in response to a user input. The user input may be received via a user interface, such as a touch panel or a button within the vehicle cabin or may be engaged automatically in response to a vehicle system command. The processor 220 may be operative to perform the ADAS algorithm using default parameters for the Kalman filter. Alternatively, upon initiation of the ADAS algorithm, the processor 220 may be operative to retrieve or request a current location from the GPS sensor 245 and to determine an initial set of Kalman parameters in response to the current location and map data indicative of the environment associated with the current location. In an additional embodiment, Kalman parameters may be determined in response to current weather conditions for the current location.

The processor 220 is then operative to periodically receive the current location from the GPS sensor 245. The processor 220 is then operative to compare the currently location to map data stored in the memory 250. The processor 220 is then operative to determine if an operating environment associated with the current location is the same as the previously indicated operating environment. If the processor 220 detects a change in the operating environment, the processor 220 is then operative to retrieve a set of Kalman filter parameters associated with the operating environment associated with the current location. The processor 220 is then operative to update the Kalman filter and the ADAS algorithm with the new Kalman filter parameters and to continue to perform the ADAS algorithm with the new parameters.

Figure 3:
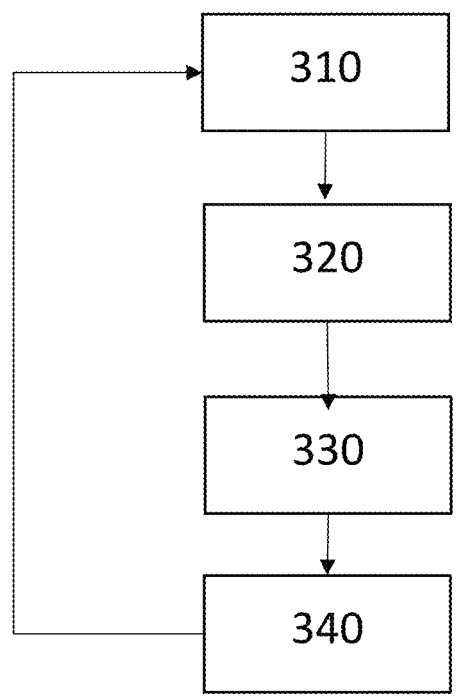
FIG. 3 shows a flow chart illustrating a method for Kalman filter parameter selection using map data for assisted driving according to another exemplary embodiment.

Turning now to FIG. 3, a flow chart illustrating an exemplary implementation of a method for Kalman filter parameter selection using map data 300 is shown. The method is first operative to initiate 310 an ADAS algorithm. The initial parameters for the Kalman filter used by the ADAS algorithm may be a default set of parameters or may be selected in response to a current location provided by a GPS and map data indicative of an environment associated with the current location. The map data may include road class. In performing the ADAS, the method is operative to generate control signals to couple to various controllers within the vehicle in order to control vehicle systems such as steering, throttle and braking. An example ADAS algorithm is adaptive cruise control where the method is operative to control the speed of the vehicle, avoid other proximate vehicles and maintain the position of the vehicle within the vehicle lane.

The method is next operative to receive 320 an updated location via a GPS sensor. The GPS sensor receives a plurality of time stamped satellite signals including the location data of a transmitting satellite. The GPS then uses this information to determine a precise location of the GPS sensor. The method is then operative to compare this new location to map data stored in a memory accessible to the vehicle processor The method is next operative to determine 330 a condition indicative of a new environment in response to the updated location. The new environment may be determined in response to comparing the updated location to a high definition map data or may be determined in response to a road class corresponding to the updated location. The new environment may be indicative of a tunnel or other overhead obstruction, such as tree foliage. The method is then operative to update 340 the Kalman filter parameters in response to the new environment. The method is then operative to continue to perform 310 the ADAS algorithm with the updated Kalman filter parameters.

Figure 4:
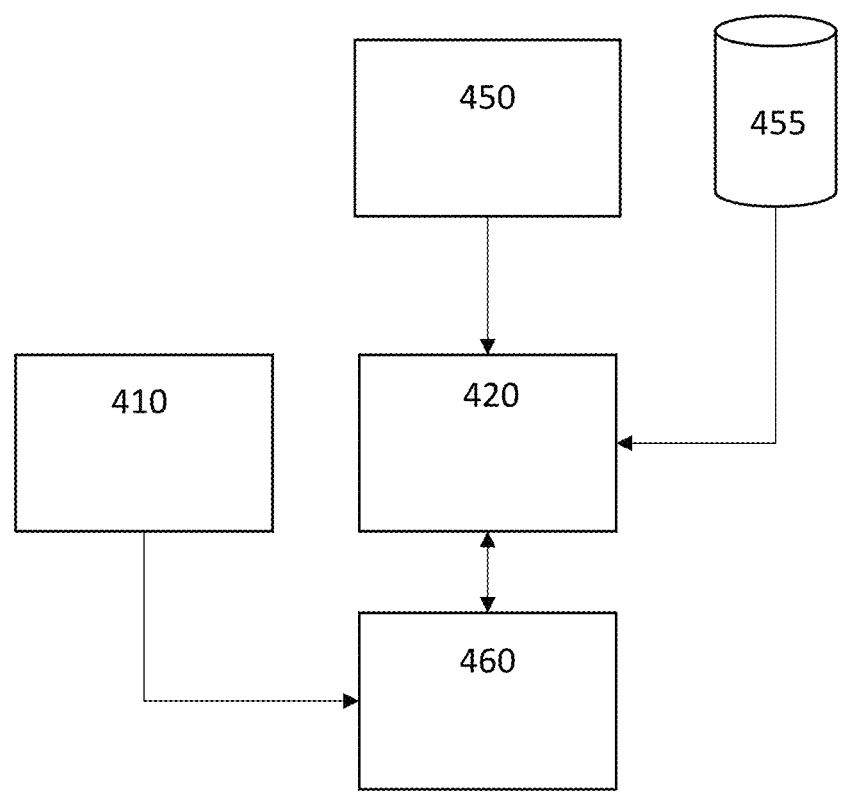
FIG. 4 shows a block diagram illustrating an exemplary implementation of a system for Kalman filter parameter selection using map data for assisted driving in a vehicle.

Turning now to FIG. 4, a block diagram illustrating an exemplary implementation of a system 400 for Kalman filter parameter selection using map data in a vehicle is shown. The exemplary system 400 may include a GPS sensor 450, a memory 455, an inertial measurement unit 410, a processor 420 and a vehicle controller 460. The GPS sensor 450 is installed within the vehicle and is operative to sense a location of the vehicle. The location is determined in response to a plurality of received satellite signals wherein each satellite signal includes data indicative of the location of the transmitting satellite and the time of transmission. The GPS sensor 450 is then operative to perform a trilateration process to estimate the location of the GPS sensor 450. This location estimation may be subject to some uncertainty associated with the satellite and receiver clocks, atmospheric conditions, satellite orbits, and signal multipath. To compensate for these uncertainties, the system 400 is operative to compare the sensed location to a location determined in response to the inertial measurement unit (IMU) 410.

The IMU 410 may include a compass, gyroscope and accelerometer and may be used to estimate heading and distance of the vehicle. The IMU information may be compared to the GPS information using a Kalman filter to determine a refined location to compensate for the GPS uncertainties and/or error. The IMU 410 output may be coupled to the vehicle controller 460, or may be coupled to the processor 420 directly.

The memory 455 is operative to store sets of Kalman filter parameters wherein each set is optimized for performance under different environmental conditions. For example, a first set of Kalman filter parameters may be optimized for a clear sky view for the GPS sensor 450 and a second set of Kalman filter parameters may be optimized for an obstructed sky view for the GPS sensor 450 such as when driving in a wooded area where tree foliage obstructs the sky view.

In a first exemplary embodiment, the processor 420 may be operative for performing an assisted driving algorithm according to a first set of Kalman filter parameters, for receiving the current location from the GPS sensor 450, for determining a second set of Kalman filter parameters in response to the current location, for performing the assisted driving algorithm according to the second set of Kalman filter parameters, and for generating a control signal for coupling to the vehicle controller 460 in response to the assisted driving algorithm according to the second set of Kalman filter parameters. The vehicle controller is then operative control a vehicle according to the assisted driving algorithm in response to the control signal.

In an alternative embodiment, the vehicle controller 460 is operative for controlling the vehicle in response to a control signal, for estimating a first estimated location in response to an IMU 410 output and for estimating a second estimated location in response to a subsequent IMU 410 output. The processor 420 is then operative for determining a first vehicle location in response to the first sensed location and the first estimated location in response to a Kalman filter using the first set of filter parameters. The processor 420 may be further operative to receive the second location, for comparing the second location to a map data indicative of an environment associated with the second location and the second set of parameters, for determining a second vehicle location in response to the second sensed location and the second estimated location in response to the Kalman filter using the second set of filter parameters. The processor 420 is then operative for generating the control signal to couple to the vehicle controller 460 in response to the second vehicle location.

Figure 5:
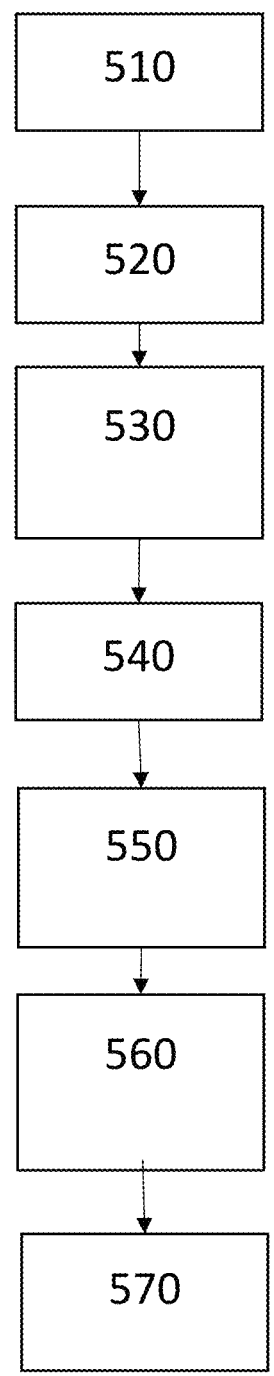
FIG. 5 shows a flow chart illustrating a method for Kalman filter parameter selection using map data for assisted driving according to another exemplary embodiment.

Turning now to FIG. 5, a flow chart illustrating an exemplary implementation of a method 500 for Kalman filter parameter selection using map data in a host vehicle is shown. The exemplary method may first be operative to perform 510 an assisted driving algorithm for controlling the host vehicle. The method is operative to perform the assisted driving algorithm using a Kalman filter having a first set of parameters. In an exemplary embodiment, the first set of parameters are a default set of parameters.

The method is next operative to receive 520 a location from a global positioning system sensor. The method is then operative to determining 530 a second set of parameters in response to the location. The second set of parameters may be determined in response to comparing the location to a map data wherein the map data may be indicative of an environment associated with the location. In an exemplary embodiment, the location may be associated with an environmental such as an obstructed sky condition, or a wooded location having overhead tree foliage.

The method is then operative to control 540 the vehicle using the Kalman filter having the second set of parameters in response to the vehicle being in the location. The Kalman filter output may be used to refine the detection of the vehicle location by a Global Navigation Satellite System (GNSS) or the like. For example, altitude information from high definition map data to improve the 3D location determined in response to the GNSS signals. Height information from the GNSS may be poor in accuracy and this is by design as all satellites are above surface of earth. using HD map enables the precise height information—in other words the height information from HD map can be assumed as information coming from satellite on surface of earth, such as a virtual satellite and improves height accuracy and overall 3D accuracy. The exemplary method may be performed in response to an advanced driver system, such as an adaptive cruise control.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a sensor operative to detect a current location wherein the sensor is part of a global positioning system;
   a memory for storing a first set of Kalman filter parameters associated with a first environmental condition and a second set of Kalman filter parameters associated with a second environmental condition;
   a camera for capturing an image;
   a processor for performing an assisted driving algorithm according to the first set of Kalman filter parameters, for receiving the current location, for determining the second environmental condition in response to the current location and confirming the second environmental condition in response to the image, for determining a second set of Kalman filter parameters in response to the confirmation of the second environmental condition, for performing the assisted driving algorithm according to the second set of Kalman filter parameters, and for generating a control signal in response to the assisted driving algorithm according to the second set of Kalman filter parameters; and a vehicle controller operative to control a vehicle in response to the control signal.

2. The apparatus of claim 1 wherein the second environmental condition is an obstructed overhead view condition.

3. The apparatus of claim 1 wherein the vehicle controller is operative to reduce a throttle output in response to the control signal.

4. The apparatus of claim 1 wherein the current location is a wooded location having overhead tree foliage.

5. The apparatus of claim 1 wherein the second set of Kalman filter parameters are tuning parameters for processing the current location from the sensor.

6. The apparatus of claim 1 wherein the Kalman filter is used to improve an accuracy of the detection of the current location.

7. A method comprising:
controlling a vehicle using a Kalman filter having a first set of parameters;
receiving a location from a global positioning system sensor;
capturing an image at the location;
determining a second set of parameters in response to the location;
confirming an environmental condition associated with the location in response to the image; and
controlling the vehicle using the Kalman filter having the second set of parameters in response to the confirmation of the environmental condition associate with the location.

8. The method of claim 7 wherein the first set of parameters are a default set of parameters.

9. The method of claim 7 wherein the location is associated with an obstructed sky condition.

10. The method of claim 7 wherein the location is a wooded location having overhead tree foliage.

11. The method of claim 7 wherein the method is performed by an advanced driver-assistance system.

12. The method of claim 7 wherein the Kalman filter is operative to improve an accuracy of the location from the global positioning system.

13. An apparatus for controlling a vehicle comprising:
a memory for storing a first set of filter parameters and a second set of filter parameters;
a sensor for detecting a first sensed location and a second sensed location;
a camera for capturing an image at the second sensed location;
a vehicle controller for controlling the vehicle in response to a control signal, for estimating a first estimated location in response to an inertial measurement unit and for estimating a second estimated location in response to the inertial measurement unit; and
a processor for determining a first vehicle location in response to the first sensed location and the first estimated location in response to a Kalman filter using the first set of filter parameters, the processor further operative to receive the second sensed location, for comparing the second sensed location to a map data indicative of an environment associated with the second sensed location and the second set of parameters, for confirming the environment associated with the second sensed location in response to the image, for determining, in response to the confirmation of the environment, a second vehicle location in response to the Kalman filter using the second set of filter parameters, and for generating the control signal in response to the second vehicle location.

14. The apparatus for controlling a vehicle of claim 13 further including generating a virtual GNSS signal and refining the first sensed location and the second sensed location in response to the virtual GNSS signal.

15. The apparatus for controlling a vehicle of claim 13 wherein the environment associated with the second location has an obstructed sky view.

16. The apparatus for controlling a vehicle of claim 13 wherein the environment associated with the second location is a wooded location has a sky view obstructed by tree foliage.

17. The apparatus for controlling a vehicle of claim 13 wherein the first set of parameters are a default set of parameters.

* * * * *